US012637640B2

(12) United States Patent
Faulstich et al.

(10) Patent No.: US 12,637,640 B2
(45) Date of Patent: May 26, 2026

(54) PRECOOLER APPARATUS FOR COOLING BEERWORT

(71) Applicants: James F. Faulstich, Richmond, VA (US); Paul W. Koda, Frederick, MD (US); Andrew J. Parker, Mechanicsville, VA (US)

(72) Inventors: James F. Faulstich, Richmond, VA (US); Paul W. Koda, Frederick, MD (US); Andrew J. Parker, Mechanicsville, VA (US)

(73) Assignee: Innovation Brewing, LLC., Richmond, VA (US)

( * ) Notice: Subject to any disclaimer, the term of this patent is extended or adjusted under 35 U.S.C. 154(b) by 1021 days.

(21) Appl. No.: 17/746,866

(22) Filed: May 17, 2022

(65) Prior Publication Data

US 2023/0374425 A1 Nov. 23, 2023

(51) Int. Cl.
*C12C 7/26* (2006.01)
*F25D 31/00* (2006.01)

(52) U.S. Cl.
CPC .............. *C12C 7/26* (2013.01); *F25D 31/003* (2013.01)

(58) Field of Classification Search
CPC ................................ C12C 7/26; F25D 31/003
See application file for complete search history.

(56) References Cited

U.S. PATENT DOCUMENTS 592,781 A * 11/1897 Hertwig .................... F25D 3/06
220/506
2,359,876 A * 10/1944 Schwaiger ................ C12C 7/26
99/278

3,195,779 A * 7/1965 Stanley ................. F25D 23/126
222/82
3,211,331 A * 10/1965 Hoffman et al. ... B01F 23/2363
222/1
4,676,400 A * 6/1987 Lamont et al. ...... B67D 1/0867
62/393

(Continued)

FOREIGN PATENT DOCUMENTS

DE      20316512 U1 * 4/2004      ............... F25D 3/02
JP      H0858892 A * 3/1996      .............. F25D 11/00

OTHER PUBLICATIONS

DE 20316512 U1 Translation (Year: 2004).*
JP H0858892 A Translation (Year: 1996).*

*Primary Examiner* — Larry L Furdge
*Assistant Examiner* — Dario Antonio Deleon
(74) *Attorney, Agent, or Firm* — Michael L. Greenberg, Esq.; Greenberg & Lieberman, LLC

(57) ABSTRACT

A precooler apparatus and method for using the same, used in combination with a downstream heat exchange system for increasing the speed of cooling beerwort and enabling a lower final temperature of the cooled beerwort. The precooler is a closable portable unit equipped with various potential configurations involving inlets, outlets, conduit, connections and valves. The precooler exhibits a chamber for holding cooling media, which may be readily recharged. The inlet to the precooler apparatus accepts a cooling water solution, which may be either passed through the interior chamber and through the cooling media or configured to bypass the cooling media within the interior chamber, before being routed to the outlet of the precooler apparatus and subsequently to a heat exchange system.

3 Claims, 7 Drawing Sheets

(56) References Cited

U.S. PATENT DOCUMENTS

| | | | | |
|---|---|---|---|---|
| 2019/0055503 A1* | 2/2019 | Sanders | .................... | C12C 7/26 |
| 2021/0324310 A1* | 10/2021 | Walls et al. | ............... | C12C 7/26 |
| 2021/0388297 A1* | 12/2021 | Cho et al. | ................ | C12C 7/26 |
| 2023/0295545 A1* | 9/2023 | Lentz et al. | .............. | C12C 7/26 |

* cited by examiner

From FIG. 6A

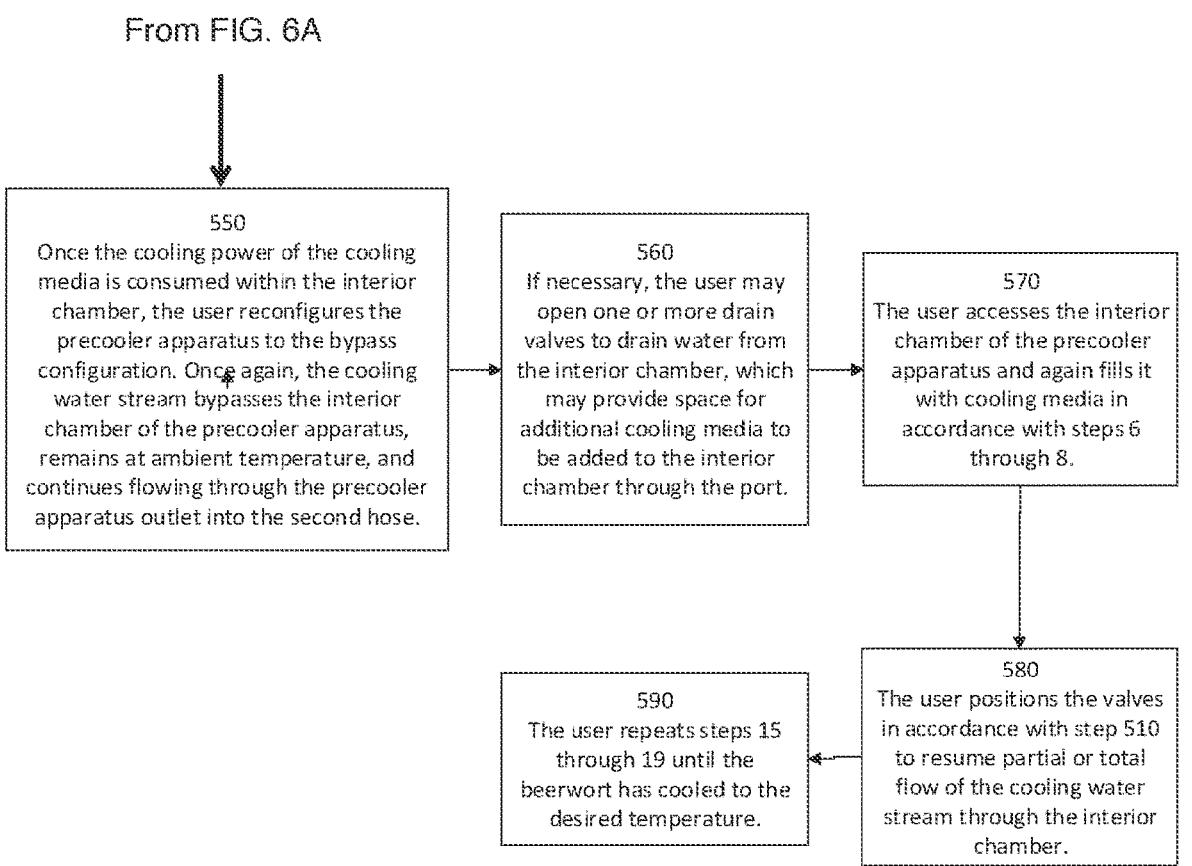

550
Once the cooling power of the cooling media is consumed within the interior chamber, the user reconfigures the precooler apparatus to the bypass configuration. Once again, the cooling water stream bypasses the interior chamber of the precooler apparatus, remains at ambient temperature, and continues flowing through the precooler apparatus outlet into the second hose.

560
If necessary, the user may open one or more drain valves to drain water from the interior chamber, which may provide space for additional cooling media to be added to the interior chamber through the port.

570
The user accesses the interior chamber of the precooler apparatus and again fills it with cooling media in accordance with steps 6 through 8.

590
The user repeats steps 15 through 19 until the beerwort has cooled to the desired temperature.

580
The user positions the valves in accordance with step 510 to resume partial or total flow of the cooling water stream through the interior chamber.

| Cross-Sectional Area Ratio [1] (unitless) | Path Length Ratio [2] (unitless) | Momentum Interruptions [3] | | Amount that Bypasses [4] (%) | Outlet Temperature [5] (F) |
| --- | --- | --- | --- | --- | --- |
| | | Along Conduit (#) | Along Interior (#) | | |
| 1 | 0.25 | 2 | 5 | 71 | 59 |
| 1 | 0.25 | 4 | 5 | 62 | 56 |
| 0.5 | 0.25 | 2 | 7 | 53 | 52 |
| 0.5 | 0.25 | 4 | 7 | 44 | 49 |
| 0.333 | 0.25 | 2 | 7 | 41 | 48 |
| 0.333 | 0.25 | 2 | 11 | 46 | 50 |

1 - Ratio of cross-sectional area for flow through the conduit path to the cross-sectional area for flow through the interior path of the precooler apparatus 2 - Ratio of length for flow through the conduit path to the length for flow through the interior path of the precooler apparatus 3 - The number of momentum interruptions along the conduit path and along the interior path of the precooler apparatus 4 - The resulting percent of the cooling water stream by weight that bypasses the interior chamber of the precooler apparatus 5 - The resulting temperature of the cooling water stream at the outlet of the precooler apparatus

PRECOOLER APPARATUS FOR COOLING BEERWORT

FIELD OF THE PRESENT INVENTION

The present invention relates to the field of home-brewing, and more specifically relates to a system and apparatus configured to be used to augment traditional beerwort cooling techniques to facilitate a rapid temperature drop of the beerwort without expensive large-scale equipment.

BACKGROUND OF THE PRESENT INVENTION

Homebrewing has increasingly become a popular pastime for countless individuals as the preference for craft beer has grown. It is a relatively inexpensive hobby to start, which can yield delicious results in a relatively short amount of time. Homebrewing beer generally requires the following steps: 1) producing a liquid extract of malted grains often referred to as wort or beerwort, 2) boiling the beerwort, 3) adding bittering or aromatic agents such as hops to the beerwort, 4) cooling the beerwort, 5) fermenting the beerwort using yeast, and 6) containerizing and carbonating the beerwort product in order to produce a final beverage. This invention is an improvement over the prior art with regard to beerwort cooling.

Ideally, successful beerwort cooling is achieved with a rapid temperature reduction to a specific range of ending temperatures using a minimum amount of cooling media. For example, a successful five (5) gallon batch of beerwort may be produced if the temperature is cooled from boiling to a nominal 72° F. or cooler within fifteen (15) to sixty (60) minutes using no more than two (2) ten (10) pound bags of cubed ice as the cooling media.

A rapid temperature reduction during beerwort cooling is important for several reasons. A shorter beerwort cooling step allows less time for undesirable organisms such as bacteria or wild yeast to begin growing in the hot beerwort prior to adding (i.e. pitching) a desired yeast, which often may be added only at lower beerwort temperatures. Second, dimethyl sulfide (DMS), a cause of undesirable flavors, may be produced in a beerwort that remains hot. As a result, a rapid temperature reduction of hot beerwort necessarily reduces the production of this undesirable compound. Third, the rapid temperature reduction of hot beerwort improves the "cold break," which is a precipitation of certain undesirable dissolved proteins. The final product is clearer and more aesthetically pleasing when fewer of these proteins remain dissolved. Finally, a rapid temperature reduction hastens the beerwort cooling step, which lessens the overall brew time.

Not only is the speed with which the beerwort is cooled important, but achieving a final temperature within a specific temperature range is critical as well. A homebrewer often seeks to achieve a final temperature for cooled beerwort that is within a specific range because it is more favorable for pitching certain yeasts. For example, ale yeasts typically require a fermentation temperature between 68° F. and 72° F., while lager yeasts prefer a fermentation temperature between 45° F. and 55° F. Also, pitching yeast at beerwort temperatures above 72° F. should be avoided. Such higher temperatures either reduce the efficiency of yeast growth or potentially kill the pitched yeast. Additionally, pitching yeast in beerwort having a higher than optimum temperature may encourage a yeast to generate fermentation byproducts that have undesirable flavors. Furthermore, a homebrewer may seek a specific range of ending temperatures for cooled beerwort that matches the temperature of pitched yeast in order to avoid any undesirable results from mismatched temperatures that can cause "temperature shock." Such "temperature shock" detrimentally affects the yeast's ability to thrive and ferment the beerwort. Finally, a homebrewer may desire a specific range of ending temperatures for cooled beerwort that is lower than the optimum range for a selected yeast. This is because the exothermic nature of the fermentation process will slightly increase the temperature of the cooled beerwort. Therefore, selecting a lower temperature range results in an adjusted final temperature for cooled beerwort that matches the temperature preference of the selected yeast.

Presently in the market, there exists an assortment of methods for the rapid temperature reduction of hot beerwort to a specific range of ending temperatures using sophisticated and expensive refrigeration devices. However, homebrewers most often rely on the cooling properties of an ambient household water supply and readily available cooling media such as cubed ice.

In one simple method, a homebrewer adds either ambient or refrigerated household water, cubed ice, or some combination of ice and water directly to the batch of hot beerwort as an amendment. While this direct cooling media amendment has the advantage of achieving a rapid temperature reduction, it also inevitably introduces a source of contamination. Contamination such as bacteria, viruses, foreign yeasts, and particulate matter may be present within the cooling media amendment itself. Also, the process of adding the cooling media to the hot beerwort exposes the batch to similar additional contaminants from the environment. Furthermore, a direct cooling media amendment is often not practical because the added water or ice can dilute the beerwort so it does not meet the criteria for the intended type of beer. Also, if the cooling requires a specific range of ending temperatures below the ambient household water temperature, then at least a portion of the cooling media amendment likely requires ice. In this instance, if the batch of hot beerwort has a volume significantly larger than five (5) gallons, then the number of bags of ice required to accomplish such cooling is significantly increased. This, in turn, can increase the cost of producing the final beverage.

Homebrewers use other methods to cool batches of hot beerwort. These methods incorporate a variety of heat exchange systems and configurations. In each configuration, the hot beerwort remains physically separated from the cooling water or other cooling media by a barrier comprising a heat exchange material. As a result, the rate with which the hot beerwort may be cooled depends upon heat transfer factors such as surface area, flow properties, and thermal properties of each aspect of the selected system. Regardless of the selected heat exchange system, the rate of cooling is directly proportional to the difference in temperature between the hot beerwort and the cooling media. Therefore, colder cooling media or colder cooling water allows for more rapid beerwort cooling, while warmer cooling media or warmer cooling water slows the rate with which the hot beerwort is cooled. As a result, any reduction in the cooling rate necessarily increases the overall time to produce a cooled beerwort ready for fermenting.

A simple method for cooling beerwort is to place the pot in which the beerwort was boiled (i.e. the "boil pot") directly into a sink or tub that contains a mixture of water and ice. This causes the heat to transfer from the hot bulk liquid beerwort, contained in the pot, through the pot wall to the surrounding mixture of water and ice. As part of this method, a homebrewer often stirs the beerwort or moves the pot around in the sink or tub in order to separately mix both the hot beerwort and the cooling media surrounding the pot. This mixing promotes heat transfer by reducing or eliminating any thermal boundary layer that develops on either side of the boil pot wall. These thermal boundary layers occur during heat transfer and act as insulation inhibiting the heat transfer needed for cooling the hot beerwort. However, there are several disadvantages associated with this method for cooling beerwort. First, using a sink or tub requires a longer time to cool the hot beerwort because there is a limited surface area for heat transfer provided by the boil pot wall. Additionally, slower cooling rates are caused by substantial thermal boundary layers forming at the heat transfer surfaces on both sides of the boil pot wall. This slower cooling rate often extends cooling time beyond sixty (60) minutes. Second, while a homebrewer may partially reduce the presence of the insulating thermal boundary layers either by moving the boil pot around in the sink or tub or stirring the hot beerwort, such movements can splash water or ice into the beerwort, which is likely to introduce contamination. Third, homebrewers often use the cooling step to separate solids from the cooling beerwort by stirring it and establishing a vortex. Moving the boiling pot during this time interferes with establishing the vortex and therefore settling solids. Fourth, this method for cooling beerwort exposes a homebrewer to safety hazards associated with moving a hot boil pot from its heat source to a sink or tub. Not only is there a risk of physical injury if a full boil pot needs to be moved, but also there is a potential for significant skin burns if the hot beerwort spills. Fifth, since the sink or tub has an open top arrangement, a significant portion of the cooling capacity of the ice and cooling water is lost to the environment. This results in having to increase the amount of ice or cooling water necessary for a homebrewer to achieve a specific temperature for the cooled beerwort within a range of ending temperatures. This addition of cooling water, or particularly the addition of cubed ice, can add cost to the overall brewing process. Finally, this cooling method requires a homebrewer to constantly monitor the cooling process over a long period of time. Not only does this extend the overall time to complete the brewing process, but also it reduces the potential benefits achieved through rapid temperature reduction during beerwort cooling.

A second conventional method for cooling beerwort incorporates an immersed cooling coil in the hot beerwort contained within a boil pot. A cooling water source, typically at household pressure and temperature, is connected to the immersed cooling coil inlet. This allows cooling water to pass through the immersed cooling coil until it reaches the cooling coil outlet. Consequently, heat transfers from the hot bulk liquid beerwort through the wall of the immersed cooling coil to the cooling water passing through the immersed cooling coil. This method can be an improvement when compared to placing the boil pot in a sink or tub of ice and cooling water because an immersed cooling coil nominally provides three (3) to five (5) times more surface area for heat transfer than the wall of a boil pot alone. In addition, the continuous flow of cooling water through an immersed cooling coil minimizes the development of a thermal boundary layer on the cooling water side of the immersed cooling coil. Finally, immersed cooling coils are often arranged so that the coil path is relatively evenly distributed throughout the volume of the hot beerwort. This reduces the opportunity for persistent hot spots to remain within the volume of the hot beerwort. While the increased heat transfer surface area, the reduced thermal boundary layer on the cooling water side of the immersed cooling coil, and the reduction of persistent hot spots within the cooling beerwort all contribute to a more rapid temperature reduction during beerwort cooling as compared to a boil pot merely immersed in ice or cooling water, there remain significant disadvantages to this beerwort cooling method.

A distinct disadvantage to using an immersed cooling coil to cool hot beerwort is often the necessity to use relatively warm household water as the cooling water supply to the cooling coil inlet. This occurs because household water temperatures are often above 70° F., particularly during summer months. This disadvantage exists because the thermodynamics of heat exchange do not allow a hot fluid to be cooled to a temperature below the temperature of the inlet cooling stream. In summer months, household water temperatures are often above 70° F., which means the inlet cooling water supply is that temperature as well. As such, a homebrewer is unable to cool the beerwort below the relatively warm inlet water temperature. The result is that specific desirable ranges of relatively cool ending temperatures for cooled beerwort cannot be achieved. Furthermore, the rate of cooling of the heat exchange system improves with a larger temperature difference between the inlet cooling water source and the hot beerwort. If the inlet cooling water source remains relatively warm, the rate of cooling of the heat exchange system is reduced. This reduced rate of cooling significantly increases the time required to sufficiently cool the hot beerwort. Finally, while using this method, some homebrewers either agitate the hot beerwort using the cooling coils themselves or stir the hot beerwort in order to reduce the thermal boundary layer on the hot side of the heat exchange system. While such agitation or stirring can slightly increase the speed and efficiency of cooling, the heat exchange system still remains limited by the elevated inlet water temperature. Also, the risk of contamination continues to exist while stirring an open boil pot of hot beerwort.

In order to improve on the performance of a cooling coil supplied with inlet cooling water and immersed in a boil pot of hot beerwort, homebrewers also may combine this method with the method of placing the boil pot directly into a sink or tub that contains a mixture of water and ice. The combination of these two methods is a partial improvement over the performance of either individual method. The cooling rate of the hot beerwort is approximately the cooling rate for each individual method added together. This is because heat simultaneously leaves the hot beerwort through the surface area provided by the cooling coil and also through the walls of the boil pot. Yet, this combined method has disadvantages similar to those of the two individual previously described methods. First, similar contamination and safety risks remain. Second, the performance of the cooling coil immersed in hot beerwort remains limited by the temperature of the inlet cooling water. Finally, if the relatively warm inlet cooling water is allowed to flow for a substantial amount of time, it will have a tendency to maintain the cooled beerwort at or slightly above the temperature of the inlet water. This has the effect of counteracting the cooling that might be achieved with the addition of ice to the open tub or sink. In such instances, a homebrewer will have incurred the cost of this additional ice without receiving its cooling benefit.

In addition, homebrewers have modified the combination of a cooling coil immersed in a boil pot of hot beerwort and the boil pot placed directly into a sink or tub that contains a mixture of water and ice. In this newer arrangement, cooling water is supplied from the ice and water mixture contained in the sink or tub using a pump, rather than directly from a household water supply. Once the cooling water passes through the cooling coil in the hot beerwort, it is returned to the sink or tub containing the mixture of ice and water. The nominal advantage of this arrangement is that since the inlet cooling water is drawn from the ice and water mixture, it is necessarily at approximately 32° F. rather than the relatively warm household water supply, which is often above 70° F. This greater temperature difference is intended to cool the beerwort more rapidly and allow a homebrewer to achieve a lower specific range of final beerwort temperatures. However, not only does this modification of the cooling coil and ice water bath combination have similar disadvantages as the original arrangement, there remain other disadvantages to this arrangement as well. A preliminary disadvantage is that since the pressure of a household cooling water supply is not available to provide water flow, a pump is required to accomplish the task. The pump is not only expensive but adds an unnecessary complication to the brewing setup.

Yet, a more important disadvantage is that the recirculation of the cooling water does not necessarily achieve the intended goals of both cooling the beerwort rapidly and cooling it to a desired lower temperature. This disadvantage exists because once the cooling water passes through the cooling coil and acquires heat from the hot beerwort, that heated water is not discharged from the system but rather recirculated back into the sink or tub containing the mixture of ice and water. The result is that the ice in the sink or tub rapidly melts, which causes the cooling water supply to rapidly heat. Once heated, the cooling water supply is no longer effective at cooling the hot beerwort. Homebrewers attempt to adjust for this problem by continuing to add excessive amounts of ice to the sink or tub in order to maintain a cool inlet water supply. In turn, this addition of ice requires a homebrewer to periodically pause the cooling process in order to discharge the excess water created from the melting ice.

Another known method for cooling beerwort incorporates two cooling coils connected in series. The first cooling coil is immersed in a sink or tub containing a mixture of ice and water, while the second cooling coil is immersed in the hot beerwort in the boil pot. A cooling water source, typically at household water temperature and pressure, is connected to the inlet of the first cooling coil. This cooling water passes through the first cooling coil allowing heat to transfer from the cooling water through the first cooling coil into the mixture of ice and water. In this manner, the temperature of the cooling water is reduced. Next, this lower temperature cooling water serves as the cooling water inlet to the second cooling coil immersed in the hot beerwort. The object of this arrangement is to increase the temperature difference between the cooling water entering the second cooling coil and the hot beerwort. This larger temperature difference is intended to both more rapidly cool the hot beerwort and allow for lower overall beerwort temperatures. However, employing two cooling coils has disadvantages similar to those associated with using a single cooling coil immersed in hot beerwort. First, thermal boundary layers develop on the exterior surfaces of each cooling coil, which significantly reduces the heat transfer efficiency. Since continuous agitation, such as stirring or moving the cooling coils, is necessary in order to reduce or eliminate these thermal boundary layers, the resulting physical demands on a homebrewer make accomplishing this task either very difficult or impossible. As a result, the inlet cooling water flowing to the second cooling coil immersed in the hot beerwort may not be significantly lower than the temperature of the household water supply. Also, as noted with other prior art methods, since the sink or tub containing the ice and water mixture has an open top arrangement, a significant portion of the cooling capacity of the water and ice is lost to the environment. Finally, often there is ice remaining in the sink or tub leaving its cooling capacity unused.

In other configurations, hot beerwort contained in a boil pot may be cooled using a counter flow heat exchanger in either a plate or concentric tube arrangement. Beerwort passes through the hot side of the heat exchanger with the flow provided by either gravity or mechanical pump. Cooling water passes through the cold side of the heat exchanger with the flow provided by either the pressure from ambient household water or a separate mechanical pump. In the arrangement where the cold side is supplied by ambient household water, the thermodynamics of the heat exchanger do not allow for the beerwort to achieve a temperature any lower than the relatively warm ambient household cooling water. In the arrangement where a mechanical pump is used, often the cooling water is drawn from a tub of mixed ice and water, pumped through the cold side of the heat exchanger, and then recirculated back to the tub. While the starting temperature of cooling water drawn from a tub of mixed ice and water is initially lower than ambient household cooling water, the heat extracted from the hot beerwort is returned to the tub during recirculation. This rapidly melts any ice present in the tub of ice water leaving nothing more than a source of warm water for continued cooling of the hot beerwort. These arrangements increase the cost of a homebrewing setup with the addition of a heat exchanger, pumps, lines, hardware, and fixtures. Also, the additional equipment must be installed, adjusted, disassembled, and finally cleaned in order to complete the brewing process. However, most importantly, these arrangements are still constrained by the temperature of the ambient household cooling water and may require excessive amounts of ice.

In view of these prior art precooling arrangements, there is a need for a new apparatus configured to provide an improvement to existing methods used to precool a cooling water solution prior to it being directed to the beerwort heat exchange system both more quickly to accomplish the cooling step and to enable the user to cool the beerwort to a target temperature range regardless of the temperature of the supply water. Such a system preferably exhibits a housing configured to contain ice or other cooling media, available connections to existing equipment, and a series of valves configured to enable the user to control precooling of the cooling water stream before it reaches an immersion coil or similar heat exchanger used to cool the beerwort, said control including cooling water flowrate and temperature.

SUMMARY OF THE PRESENT INVENTION

The present invention is a liquid cooling apparatus configured to augment the cooling provided by household water when used for the reduction of the temperature of beerwort during homebrewing. The present invention accomplishes the precooling of household water through direct contact with cooling media under the pressure of a typical household water supply. The present invention is configured to enhance and expedite the cooling process afforded by conventional in-line coolers including, but not limited to, immersion coils, plate heat exchangers, or counterflow heat exchangers.

It is a further object of the present invention to augment beerwort cooling with a device that is convenient to use during the brewing process by being portable and easy to handle and install.

It is another object of the present invention to augment beerwort cooling with a device that connects to existing equipment, including the water supply and the heat exchange system, with minimal or no modification required by a homebrewer.

It is a further object of the present invention to include several options for incorporating cooling media, which have the ability to absorb heat. This includes adding cooling media such as ice or ice pack blocks that are either removable or integral with the apparatus. In addition, this includes the ability to add water and freeze it within the apparatus.

It is a further object of the present invention to augment beerwort cooling with a device that efficiently employs the cooling power of cooling media by allowing the bypass of the apparatus when the cooling media is not needed, which lowers the overall amount of cooling media used in the beerwort cooling step.

It is a further object of the present invention to augment beerwort cooling with a apparatus that is convenient to use during the brewing process, whereby a homebrewer has the option of configuring the apparatus with more than one unit so that a unit may be filled with cooling media while the other unit is actively augmenting beerwort cooling.

It is a further object of the present invention to augment beerwort cooling via an apparatus that is convenient to use during the brewing process by providing an opening to the apparatus, which allows for refilling with cooling media while the cooling process continues.

It is a further object of the present invention to augment beerwort cooling with an apparatus that is convenient to use during the brewing process by controlling cooling water flow at the apparatus rather than using a valve at the source of the cooling water supply.

It is a further object of the present invention to augment beerwort cooling with a device that is convenient to use during the brewing process by controlling the extent to which cooling water bypasses or flows through the apparatus in order to attain a desired cooling water temperature.

It is a further object of the present invention to effectively utilize the cooling media held within the apparatus by distributing cooling water through the apparatus using a cooling water pathway through the cooling media, which is established by the locations of the cooling water inlet and outlet.

It is a further object of the present invention to effectively utilize the cooling media held within the apparatus by distributing cooling water through the apparatus using a cooling water pathway through the cooling media, which is established by the arrangement of at least one baffle within the apparatus.

It is a further object of the present invention to provide an apparatus with instrumentation to measure or display parameters, such as temperature and cooling water flow, which may optimize or control beerwort cooling.

It is a further object of the present invention to provide an apparatus, which has a sufficiently low manufacture and distribution cost so that the apparatus is readily available to the buying public, as a lower cost option for precooling beerwort rather than incorporating a second cooling coil or recirculation pump.

It is a further object of the present invention to provide an apparatus that readily can be used inside or outside the home for precooling beerwort in the homebrewing process.

These, together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated example embodiments of the invention.

The following brief descriptions of the drawings are provided to explain possible embodiments of the present invention, but are not provided to limit the scope of the present invention.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 6B depicts a continuation of the flow chart shown in FIG. 6A.

FIG. 7 presents parameters that affect the relative pressure drops in the bypass path and the path through the precooler apparatus with resulting bypass percentage and outlet temperature.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
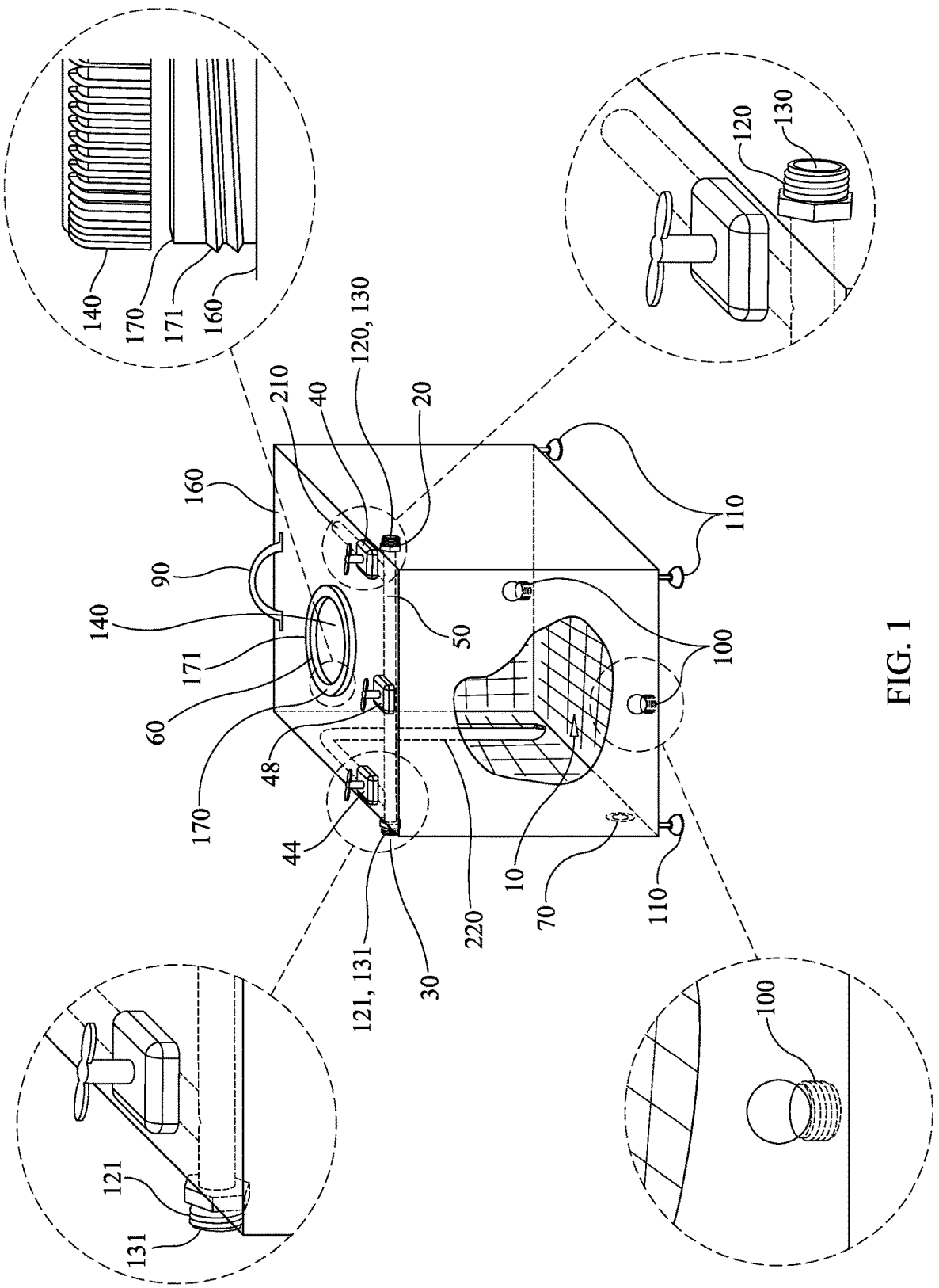
FIG. 1 depicts a front and side view of an example embodiment of the present invention with standard male hose connections.

The present invention is an apparatus for precooling inlet water, which is subsequently directed to a heat exchange system, either a cooling coil or other heat exchanger, during a beerwort cooling step of a process for producing home-brewed alcoholic beverages. The apparatus of the present invention is a portable enclosed container having an interior chamber (10), cooling water inlet (20), cooling water outlet (30), inlet valve (40), outlet valve (44), bypass valve (48), conduit (50) shown as an integrated pipe or tube, inlet conduit branch (210) shown as an integrated pipe or tube, outlet conduit branch (220) shown as an integrated pipe or tube, at least one port (60) for access to interior chamber (10) of the apparatus, and at least one drain valve (70) for draining liquid water from interior chamber (10) to the exterior of the apparatus as depicted in FIG. 1. The apparatus may be outfitted with structures or hardware necessary to accommodate carrying or mounting on a stand or frame. Such structures preferably include at least one handle (90) at least one mount (100) or both as depicted in FIG. 1. In addition, the apparatus may be constructed in a manner that allows it to stand freely on either the ground or other structure with a set of either integrated or attached feet (110). In the example embodiments of the present invention, the apparatus is manufactured using high density polyethylene, stainless steel, or other durable material capable of operating in temperature ranges approximately between 32° F. and 212° F.

Figure 2:
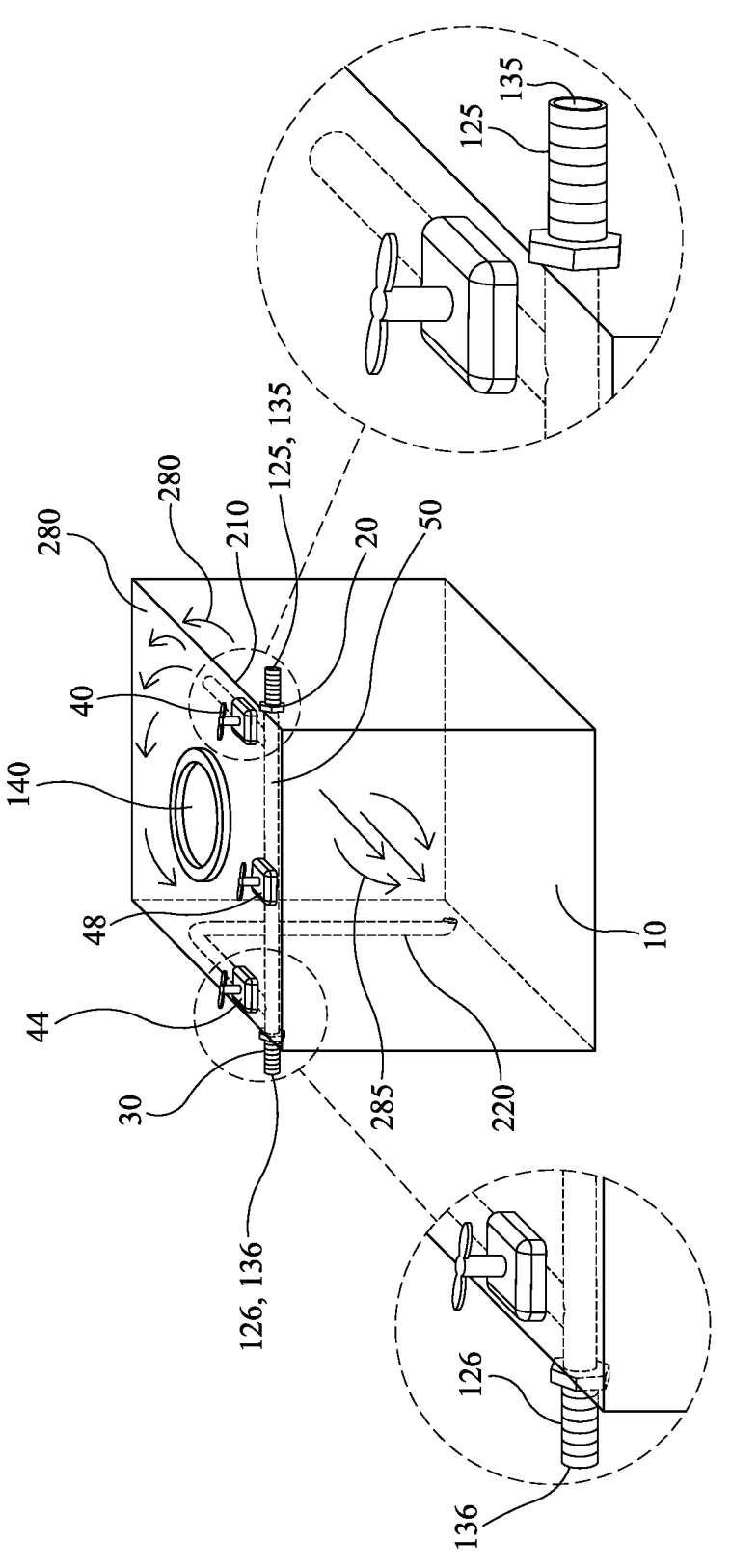
FIG. 2 depicts a front and side view of an example embodiment of the present invention with male barb connections, detailing the general path of cooling water throughout the apparatus.

Cooling water inlet (20) is disposed on the exterior of the apparatus and allows liquid cooling water to follow a fluid pathway into interior chamber (10) of the apparatus at common household water supply pressures (i.e. approximately 40 to 80 psi) and temperatures (i.e. approximately 32° F. to 85° F.). In one embodiment, cooling water inlet (20) comprises a threaded cooling water inlet stem (120) with a threaded cooling water inlet opening (130) providing a fluid pathway into interior chamber (10) of the apparatus as shown in FIG. 1, where threaded cooling water inlet stem (120) is a threaded male connector sufficient to accept a corresponding threaded female connector found on one end of a typical garden hose. In another embodiment, cooling water inlet (20) comprises an unthreaded cooling water inlet stem (125) with an unthreaded cooling water inlet opening (135) providing a fluid pathway into interior chamber (10) of the apparatus where unthreaded cooling water inlet stem (125) is without threads as shown in FIG. 2 and serves as a post to which a hose may be fitted either by friction or by the use of a variety of one or more clamps. There are alternative embodiments employing several connection systems conventionally available on the market including, but not limited to, screw, flange, compression, and quick disconnect. In these embodiments, a hose is attached to cooling water inlet (20) as shown in FIG. 2, which serves as the source of inlet cooling water and is most often provided by a household water supply. In addition, the connection between the hose and cooling water inlet (20) remains sufficiently watertight under typical household water supply pressure. Cooling water outlet (30) is disposed on the exterior of the apparatus and allows liquid cooling water to exit interior chamber (10) of the apparatus at common household water supply pressures and at temperatures that are the same or lower than the inlet water temperature. The apparatus is designed so that the temperature difference between cooling water inlet (20) and cooling water outlet (30) may be nominally selected by a homebrewer. In one embodiment, and similar to the cooling water inlet (20), cooling water outlet (30) comprises a threaded cooling water outlet stem (121) with a threaded cooling water outlet opening (131) providing a fluid pathway from interior chamber (10) of the apparatus as shown in FIG. 1, where threaded cooling water outlet stem (121) is a threaded male connector sufficient to accept a corresponding threaded female connector found on one end of a tube such as a conventional garden hose. In another embodiment, cooling water outlet (30) comprises an unthreaded cooling water outlet stem (126) with an unthreaded cooling water outlet opening (136) providing a fluid pathway from interior chamber (10) of the apparatus where unthreaded cooling water outlet stem (126) is without threads as shown in FIG. 2 and serves as a post to which a tube may be fitted either by friction or by the use of a variety of one or more clamps. In these embodiments, the tube attached to cooling water outlet (30) serves as the pathway for exiting cooling water to reach the inlet of a heat exchange system being used to cool hot beerwort. As with the connection between a hose and cooling water inlet (20), the connection between cooling water outlet (30) and a tube remains sufficiently watertight under typical household water supply pressure.

In one embodiment of access to interior chamber (10), separate from both cooling water inlet (20) and cooling water outlet (30), port (60) is disposed on upper surface (160) of the apparatus as depicted in FIG. 1. Port (60) is wide enough to accommodate filling interior chamber (10) of the apparatus with cooling media transferred from the exterior of the apparatus. Typically, such cooling media is cube ice and is transferred into interior chamber (10), having the necessary volume to accept five (5), ten (10), or twenty (20) pound bags of cubed ice, which are readily available at retail establishments. In another embodiment, port (60) may be more narrow if it is used, together with a funnel, to accommodate the transfer of cooling media from the exterior of the apparatus to interior chamber (10). In one embodiment, port (60) is constructed with a port flange (170), which incorporates a threaded male connector (171) on the exterior side of port flange (170). Threaded male connector (171) is sufficient to accept a corresponding threaded female lid (140). Once attached, the contact between threaded male connector (171) and threaded female lid (140) is sufficient to maintain a watertight seal under typical household water supply pressures.

The present invention contemplates alternative embodiments employing several closure systems conventionally available on the market including, but not limited to, bolted flange, snap on, friction, and twist-locking systems. In these embodiments, the closure system provides ready access to interior chamber (10) for the homebrewer to add or replace cooling media. In addition, the closure system remains sufficiently watertight under typical household water supply pressure.

SCENARIO 1—First Embodiment: Precooler apparatus with an integrated manifold with three valves, two of the valves existing on the conduit branches, and one valve existing at the center of the conduit:

The precooler apparatus is a portable enclosed container that incorporates an interior chamber with an integrated manifold consisting of a conduit, conduit branches, and valves depicted in FIGS. 1-4. Conduit (50), shown as a pipe or tube but also may be constructed as an integrated flow chamber or other fluid pathway, is disposed between cooling water inlet (20) and cooling water outlet (30). A first end of inlet conduit branch (210), proximate to and downstream from cooling water inlet (20), is attached to and in fluid communication with conduit (50). In addition, a second end of inlet conduit branch (210), positioned in the upper volume of interior chamber (10), is in fluid communication with interior chamber (10) of the precooler apparatus. Also, a first end of outlet conduit branch (220), positioned in the lower volume of interior chamber (10), is in fluid communication with interior chamber (10) of the precooler apparatus. Furthermore, a second end of outlet conduit branch (220), proximate to and upstream from cooling water outlet (30), is attached to and in fluid communication with conduit (50).

Inlet conduit branch (210) maintains inlet valve (40) proximate to conduit (50). Inlet valve (40) may be positioned in a manner that, when open, allows the inlet cooling water stream to be directed from conduit (50) through inlet conduit branch (210) into interior chamber (10) of the precooler apparatus, or, when fully closed, directs the inlet cooling water stream through conduit (50) on a path to cooling water outlet (30) bypassing interior chamber (10). Outlet conduit branch (220) maintains outlet valve (44) proximate to conduit (50). Outlet valve (44) is positioned in a manner that, when open, allows the cooling water stream to be directed from interior chamber (10) of the precooler apparatus, through outlet conduit branch (220) and into conduit (50) in order to be directed to cooling water outlet (30) or, when fully closed, prevents the cooling water stream from exiting interior chamber (10) of the precooler apparatus. In addition, conduit (50) maintains bypass valve (48), positioned between inlet conduit branch (210) and outlet conduit branch (220). Bypass valve (48), when open, allows the cooling water stream to flow through conduit (50) from cooling water inlet (20) to cooling water outlet (30) or, when fully closed, prevents the cooling water stream from flowing from cooling water inlet (20) through conduit (50) to cooling water outlet (30). Inlet valve (40), outlet valve (44), and bypass valve (48) may be incorporated into the precooler apparatus as either a toggle valve with open or closed positions or a variable valve with adjustable open and closed positions in accordance with conventional valve structures. In another embodiment, inlet valve (40), outlet valve (44), and bypass valve (48) are all variable valves, which a homebrewer may manually adjust and tune to configure the operation of the precooler apparatus.

In order to operate this first embodiment of the precooler apparatus, a homebrewer connects a hose or other fixture to cooling water inlet (20). Most often, this connection provides a household water supply at a conventional household temperature and pressure. In addition, a homebrewer connects a first end of a tube or other fixture to cooling water outlet (30) and a second end of the tube or other fixture to the inlet of a downstream heat exchange system such as an immersion cooler or other conventional in-line cooler. This connection provides a path for the cooling water stream exiting the precooler apparatus to enter the inlet of the downstream heat exchange system. A homebrewer fills interior chamber (10) of the precooler apparatus with ice or other cooling media through one or more port(s) (60) as shown in FIG. 1, which are then secured with one or more threaded female lid(s) (140).

In order to cool the upper temperature range (i.e., while the beerwort is substantially hotter than the ambient cooling water stream, between approximately 212° F. and 110° F.) of the hot beerwort or "hot stage," a homebrewer fully closes both inlet valve (40) and outlet valve (44) and fully opens bypass valve (48). The cooling water stream is then allowed to flow through cooling water inlet (20) of the precooler apparatus. This initial valve setting establishes a "bypass configuration" by directing the cooling water stream through conduit (50) to cooling water outlet (30) without allowing the cooling water stream to enter interior chamber (10) of the precooler apparatus. This bypass configuration allows a homebrewer to use only a relatively warmer household cooling water stream to cool the hot stage of the hot beerwort. Once the hot beerwort is no longer in the hot stage, a homebrewer fully opens both inlet valve (40) and outlet valve (44) and fully closes bypass valve (48). This valve reconfiguration directs the cooling water stream from conduit (50) through inlet conduit branch (210) into the cooling media-filled interior chamber (10) of the precooler apparatus. Once the cooling water stream enters interior chamber (10), it is further cooled by contact with the cooling media. Then, the cooling water stream exits through outlet conduit branch (220) into conduit (50) and subsequently through cooling water outlet (30). This configuration prevents the cooling water stream from passing straight through conduit (50) without first passing through interior chamber (10). If ice is used as the cooling media, the cooling water stream leaving the cooling media-filled interior chamber (10) of the precooler apparatus is at a nominal 32° F. Consequently, the cooling water stream entering the downstream heat exchange system has a significantly cooler temperature than household cooling water at normal household temperatures. As the cooling water stream entering interior chamber (10) of the precooler apparatus cools, cooling media within interior chamber (10) will melt or otherwise lose the ability to further cool the cooling water stream. As a result, a homebrewer may need to add additional cooling media to continue cooling the hot beerwort.

Figure 4:
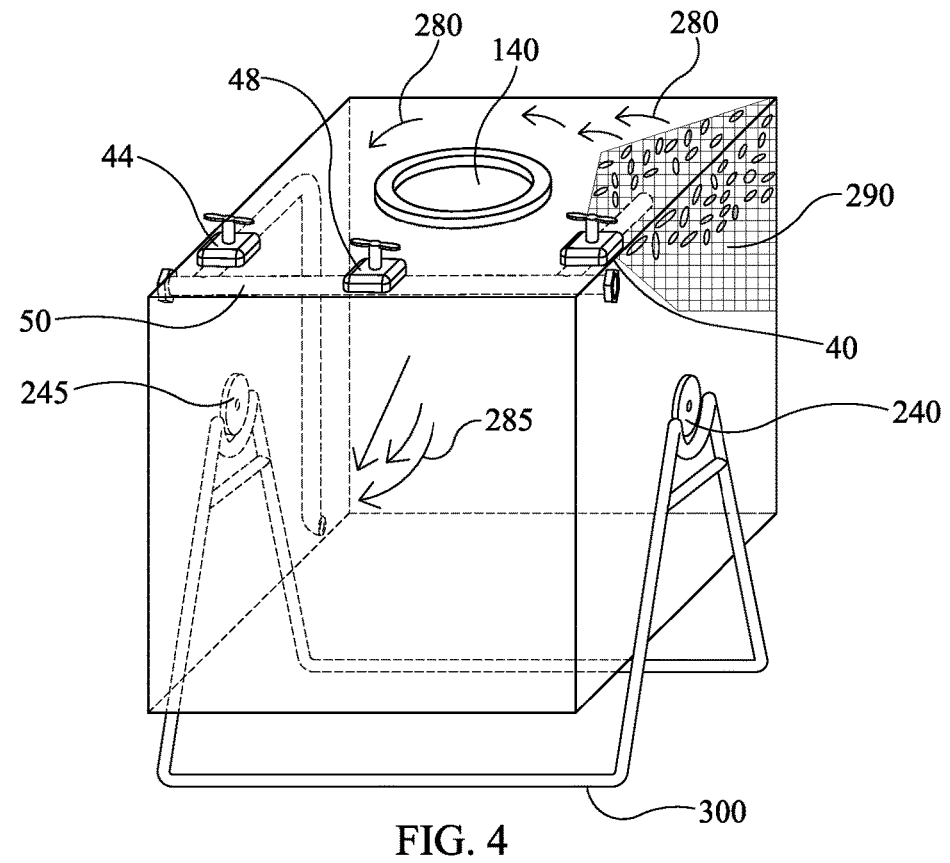
FIG. 4 depicts a front and side view of an example embodiment of the present invention, showing the apparatus on a stand with the ability to swivel. In addition, this figure shows the flow of cooling water and the movement of floating cooling media within the apparatus when equipped with a baffle.

As this condition occurs, a homebrewer again configures the valves so that inlet valve (40) and outlet valve (44) are fully closed and bypass valve (48) is fully open, which again establishes the bypass configuration for the inlet cooling water stream. At this point, the valves on both inlet conduit branch (210) and outlet conduit branch (220) are closed so no cooling water stream flows into interior chamber (10) of the precooler apparatus; however, the cooling water stream continues to flow to the downstream heat exchange equipment at ambient temperature. A homebrewer unseals threaded female lid(s) (140) and opens port(s) (60) allowing access to interior chamber (10) of the precooler apparatus. The water remaining in interior chamber (10) may be removed in one of three ways in order to make room for more cooling media. One method is to open the drain valve (70) from interior chamber (10) of the precooler apparatus and allow the remaining water to drain. Another method is to tilt the precooler apparatus and allow the remaining water to exit port(s) (60), which provides an exiting fluid pathway for the water from interior chamber (10) of the precooler apparatus. A third method for removing water or other cooling media from interior chamber (10) of the precooler apparatus is to swivel the entire precooler apparatus at both swivel connection one (240) and swivel connection two (245), which are engaged with and supported by stand (300), as depicted in FIG. 4. The precooler apparatus may be swiveled as far as needed until the remaining water or other media is capable of fully exiting through port(s) (60).

Once drained, drain valve (70) is closed and the precooler apparatus is returned to its operating position. Interior chamber (10), now with all or a portion of the water removed, is again filled with cooling media through port(s) (60). Port(s) (60) are then secured with one or more threaded female lid(s) (140). In order to continue cooling the hot beerwort using precooled water, the homebrewer again fully opens both inlet valve (40) and outlet valve (44) and fully closes bypass valve (48). The valve reconfiguration directs the entirety of the inlet cooling water stream through cooling media-filled interior chamber (10) and subsequently to the cooling water outlet (30). The cooling water stream is then directed to the downstream heat exchange system to continue cooling the hot beerwort. This process of refilling interior chamber (10) of the precooler apparatus with cooling media may be repeated as many times as necessary to achieve the desired cooler temperature of the hot beerwort.

At certain times during the beerwort cooling process, a homebrewer may choose to either reduce the fluid flow or adjust the temperature of the cooling water stream exiting cooling water outlet (30). In order to reduce the fluid flow in the bypass configuration with inlet valve (40) and outlet valve (44) closed, a homebrewer may partially close bypass valve (48) to adjust the flow of the cooling water stream to a desired lower flow rate. In the configuration where inlet valve (40) and outlet valve (44) are both open, bypass valve (48) is closed, and the cooling water stream is flowing through interior chamber (10), rather than through conduit (50), a homebrewer may partially close either inlet valve (40) or outlet valve (44) in order to adjust the flow of the cooling water stream to the desired lower flow rate. In the configuration where the cooling water stream is simultaneously passing through both conduit (50) and interior chamber (10), a homebrewer either may leave outlet valve (44) open and coordinate the adjustment of inlet valve (40) and bypass valve (48) or leave inlet valve (40) open and coordinate the adjustment of outlet valve (44) and bypass valve (48) to adjust the flow of the cooling water stream to the desired lower flow rate.

In addition, a homebrewer may adjust the temperature of the outlet cooling water stream by adjusting the ratio of the amount of the cooling water stream passing through conduit (50) to the amount of the cooling water stream passing through cooling media-filled interior chamber (10). Since the cooling water stream passing through conduit (50) is nominally at a household temperature of approximately 70° F. and the cooling water stream passing through an ice-filled interior chamber (10) is approximately 32° F., a homebrewer has the option of selecting a cooling water stream outlet temperature anywhere between these two values. A homebrewer may select a warmer cooling water stream outlet temperature (i.e. a temperature closer to a nominal household temperature of approximately 70° F.) by partially closing inlet valve (40) or outlet valve (44) and increasing the opening of bypass valve (48). This configuration causes a larger percentage of the cooling water stream to bypass the additional cooling provided by cooling media within interior chamber (10). Conversely, a homebrewer may select a cooler cooling water stream outlet temperature (i.e. a temperature closer to 32° F. with an ice-filled interior chamber (10)) by partially closing bypass valve (48) and increasing the opening of inlet valve (40) and outlet valve (44). Consequently, this configuration causes a larger percentage of cooling water stream to enter interior chamber (10) and gain the benefit of additional cooling provided by cooling media present within interior chamber (10).

In this first embodiment, the locations of cooling water inlet (20) and cooling water outlet (30) are near the top of the precooler apparatus. These locations minimize the release of any fluid contents from the precooler apparatus when hoses are disconnected from either cooling water inlet (20) or cooling water outlet (30). This allows a homebrewer to disconnect the apparatus from its connections and carry it to a different location for it to be emptied of water or filled with cooling media while at the same time reducing spills.

In this first embodiment, the placement of both the second end of inlet conduit branch (210) and the first end of outlet conduit branch (220) increases contact between the cooling water stream and any existing cooling media such as ice. The second end of inlet conduit branch (210) introduces the cooling water stream to interior chamber (10) at a location that directly impacts floating ice or other cooling media. Furthermore, the second end of inlet conduit branch (210) directs the cooling water stream parallel and proximate to both the side and top of interior chamber (10) to create rotational water flow (280), which facilitates mixing between the cooling water stream and any floating cooling media. The first end of outlet conduit branch (220) is located proximate to the bottom of interior chamber (10) diagonally opposite from the second end of inlet conduit branch (210). The positions of the second end of inlet conduit branch (210) and the first end of outlet conduit branch (220) are located to increase the distance between the two points within interior chamber (10). This creates lateral water flow (285) of the cooling water stream across interior chamber (10), which increases both the surface area contact between the cooling water stream and the cooling media and lengthens the time the cooling water stream remains inside interior chamber (10). These two conditions increase the cooling efficiency of the precooler apparatus.

The addition of baffle (290), depicted in FIG. 4, increases the agitation of the cooling water stream with the cooling media and therefore improves mixing. In addition, baffle (290) maintains the relative positions of the floating cooling media near the second end of inlet conduit branch (210). This allows the cooling water stream to make direct contact with the cooling media entrained by baffle (290) as the cooling water stream enters interior chamber (10). This contact increases the cooling efficiency of the cooling media.

In another embodiment, the precooler apparatus uses cooling media in the form of block ice pre-frozen within interior chamber (10) prior to use. In this configuration, the second end of inlet conduit branch (210) directs the cooling water stream parallel and proximate to the side of interior chamber (10) and downward from the top of interior chamber (10). Here, the position of the second end of inlet conduit branch (210) does not create rotational water flow. Rather, the cooling water stream is directed onto the top surface of the block ice to increase cooling efficiency. In addition, the first end of outlet conduit branch (220) is located proximate to the top, rather than the bottom, of interior chamber (10), but still diagonally opposite from the second end of inlet conduit branch (210). Although to a lesser extent, this configuration still creates lateral water flow (285) of the cooling water stream across the top of interior chamber (10). This lateral water flow provides substantial surface area contact between the cooling water stream and the block ice and serves to lengthen the time the cooling water stream remains inside interior chamber (10). As described above, these two conditions increase the cooling efficiency of the precooler apparatus when using pre-frozen block ice. The positioning of both the second end of inlet conduit branch (210) and the first end of outlet conduit branch (220) near the top of the interior chamber (10) avoids clogging both of those ends with a portion of the block ice as it is being pre-frozen in the lower portion of interior chamber (10).

SCENARIO 2—Precooler apparatus with an integrated manifold with two variable valves, one on the conduit inlet branch and one at the center of the conduit, and a single check valve on the conduit outlet branch:

In another embodiment similar to the first embodiment, the precooler apparatus incorporates a similarly situated portable enclosed container incorporating an interior chamber with an integrated manifold consisting of a conduit, conduit branches, and valves shown in FIGS. 1-4. As depicted in the first embodiment, conduit (50) remains disposed between cooling water inlet (20) and cooling water outlet (30). In addition, conduit (50) incorporates: a similarly situated inlet conduit branch (210) maintaining a similarly functioning inlet valve (40) proximate to conduit (50), a similarly situated outlet conduit branch (220) maintaining outlet valve (44) proximate to conduit (50), and a similarly positioned and similarly functioning bypass valve (48) positioned in conduit (50) between inlet conduit branch (210) and outlet conduit branch (220). However, in this embodiment, the functioning of outlet valve (44) is distinct. In particular, outlet valve (44) is a one-way or "check" valve which allows the cooling water stream to exit through outlet conduit branch (220) into conduit (50) and subsequently through cooling water outlet (30) while at the same time restricting any reverse cooling water stream flow back through outlet conduit branch (220) and back into interior chamber (10).

The operation of this embodiment is similar to the first embodiment except that a homebrewer maintains flow control of the cooling water stream using only inlet valve (40) and bypass valve (48). In this embodiment, outlet valve (44) is not used for any flow control since it is a check valve rather than a variable valve. Additionally, to cool the hot stage, a homebrewer fully closes inlet valve (40) and fully opens bypass valve (48). This hot stage valve configuration directs the cooling water stream from cooling water inlet (20) through conduit (50) and then through cooling water outlet (30) without allowing the cooling water stream to enter interior chamber (10) either through closed inlet valve (40) or in a reverse direction through outlet valve (44), which is a check valve. Once the hot beerwort is cooled below the threshold for the hot stage, a homebrewer fully opens inlet valve (40) and fully closes bypass valve (48). This reconfiguration directs the inlet cooling water stream through the cooling media-filled interior chamber (10) and through outlet valve (44) into conduit (50) and then through cooling water outlet (30). This valve arrangement establishes a cooling water stream pathway through interior chamber (10) rather than allowing the cooling water stream to pass straight through conduit (50). In the instances where a homebrewer needs to reestablish a bypass configuration, inlet valve (40) is again closed and bypass valve (48) is again fully opened. Outlet valve (44) requires no input since it remains a check valve. As with the first embodiment, in this embodiment, a homebrewer may choose to either reduce the cooling water stream flow or adjust the temperature of the cooling water stream exiting cooling water outlet (30). With inlet valve (40) closed and the precooler apparatus in the bypass configuration, a homebrewer may reduce the cooling water stream flow rate by partially closing bypass valve (48). The cooling water stream flow rate may be fine-tuned with incremental adjustments to bypass valve (48). In the configuration with inlet valve (40) open, bypass valve (48) closed, and the cooling water stream flowing through interior chamber (10), a homebrewer may reduce the cooling water stream flow rate by partially closing inlet valve (40). In this configuration, the cooling water stream flow rate may be fine-tuned with incremental adjustments to inlet valve (40). In the configuration where the cooling water stream is simultaneously passing through bypass valve (48) and interior chamber (10), a homebrewer may coordinate the positions of inlet valve (40) and bypass valve (48) to adjust the cooling water stream to a desired flow rate. In addition, as with the first embodiment, in this embodiment, a homebrewer may adjust the temperature of the cooling water stream exiting cooling water outlet (30) by adjusting the ratio of the amount of cooling water passing through bypass valve (48) to the amount of cooling water passing through cooling media-filled interior chamber (10). A homebrewer may select a warmer cooling water stream temperature at cooling water outlet (30) by partially closing inlet valve (40) and increasing the opening of bypass valve (48). As described above, this configuration causes a larger percentage of the cooling water stream to bypass the additional cooling provided by the cooling media contained within interior chamber (10). Conversely, a homebrewer may select a cooler cooling water stream temperature at cooling water outlet (30) by partially closing bypass valve (48) and increasing the opening of inlet valve (40). Also, as described above, this configuration causes a larger percentage of the cooling water stream to enter interior chamber (10) and gain the benefit of the additional cooling provided by the cooling media present within that space. In this embodiment, with each of these valve configurations, a homebrewer does not provide input to the outlet valve (44) since it is a check valve.

SCENARIO 3—Precooler apparatus with an integrated manifold with one three-way variable valve downstream from the cooling water inlet and one check valve on the outlet branch:

In other embodiments, the precooler apparatus incorporates a similarly situated portable enclosed container incorporating a similar interior chamber with a similarly located integrated manifold consisting of a conduit, conduit branches, and valves. As depicted in the first embodiment, conduit (50) remains disposed between cooling water inlet (20) and cooling water outlet (30). Furthermore, conduit (50) incorporates: a similarly situated inlet conduit branch (210), a similarly situated outlet conduit branch (220) maintaining outlet valve (44) configured as a check valve and proximate to conduit (50), and a similarly positioned and similarly functioning bypass valve (48) positioned in conduit (50) between inlet conduit branch (210) and outlet conduit branch (220). In this embodiment, a single three-way inlet valve is disposed at the intersection of conduit (50) and inlet conduit branch (210). The three-way inlet valve, which replaces inlet valve (40) and bypass valve (48) described in earlier embodiments, allows the cooling water stream to be directed either through inlet conduit branch (210) into interior chamber (10) of the precooler apparatus or through conduit (50) on a path to cooling water outlet (30). The three-way inlet valve provides for variable cooling water stream flow control, which allows a homebrewer to select a portion of the cooling water stream to be directed into interior chamber (10) of the precooler apparatus and another portion of the cooling water stream to remain in conduit (50) on a path to cooling water outlet (30). This embodiment is similar to the first embodiment with two distinct differences. First, the three-way inlet valve simultaneously controls both the amount of the cooling water stream that flows through conduit (50) on a path to cooling water outlet (30) and the amount of the cooling water stream that flows into interior chamber (10). A homebrewer may choose to have the cooling water stream: entirely bypass interior chamber (10), entirely flow through interior chamber (10), or flow in each pathway according to a proportion established by the homebrewer adjusting the three-way valve. Second, the total flow rate of the cooling water stream through the apparatus is controlled using the flow control valve located at the upstream source of the cooling water stream prior to entering the precooler apparatus, rather than with any valves present within the precooler apparatus.

As with the first embodiment, in this embodiment, a homebrewer may choose to adjust the temperature of the cooling water stream exiting cooling water outlet (30). A homebrewer adjusts this temperature by changing the ratio of the amount of the cooling water stream passing through conduit (50) on a path to cooling water outlet (30) to the amount of the cooling water stream passing through cooling media-filled interior chamber (10). A homebrewer may select a warmer cooling water stream temperature exiting the precooler apparatus by turning the three-way valve toward conduit (50). This causes a larger percentage of the cooling water stream to bypass the additional cooling provided by the cooling media within interior chamber (10). Conversely, a homebrewer may select a cooler cooling water stream temperature exiting the precooler apparatus by turning the three-way valve toward first conduit branch (210). This causes a larger percentage of the cooling water stream to enter interior chamber (10) and gain the benefit of additional cooling provided by the cooling media present within interior chamber (10). In the first configuration of the present embodiment, a homebrewer does not provide input to outlet valve (44) since it is configured as a check valve.

SCENARIO 4—Precooler Apparatus with an external manifold with three variable valves, two valves located on the conduit branches and one valve located at the center of the conduit:

In another embodiment, similar to the first embodiment, the precooler apparatus incorporates a similarly situated portable enclosed container but with an external, rather than internal, manifold consisting of a conduit, conduit branches, and valves as described below. As a result, cooling water stream flow control is accomplished on the exterior of the portable enclosed container.

Figure 5:
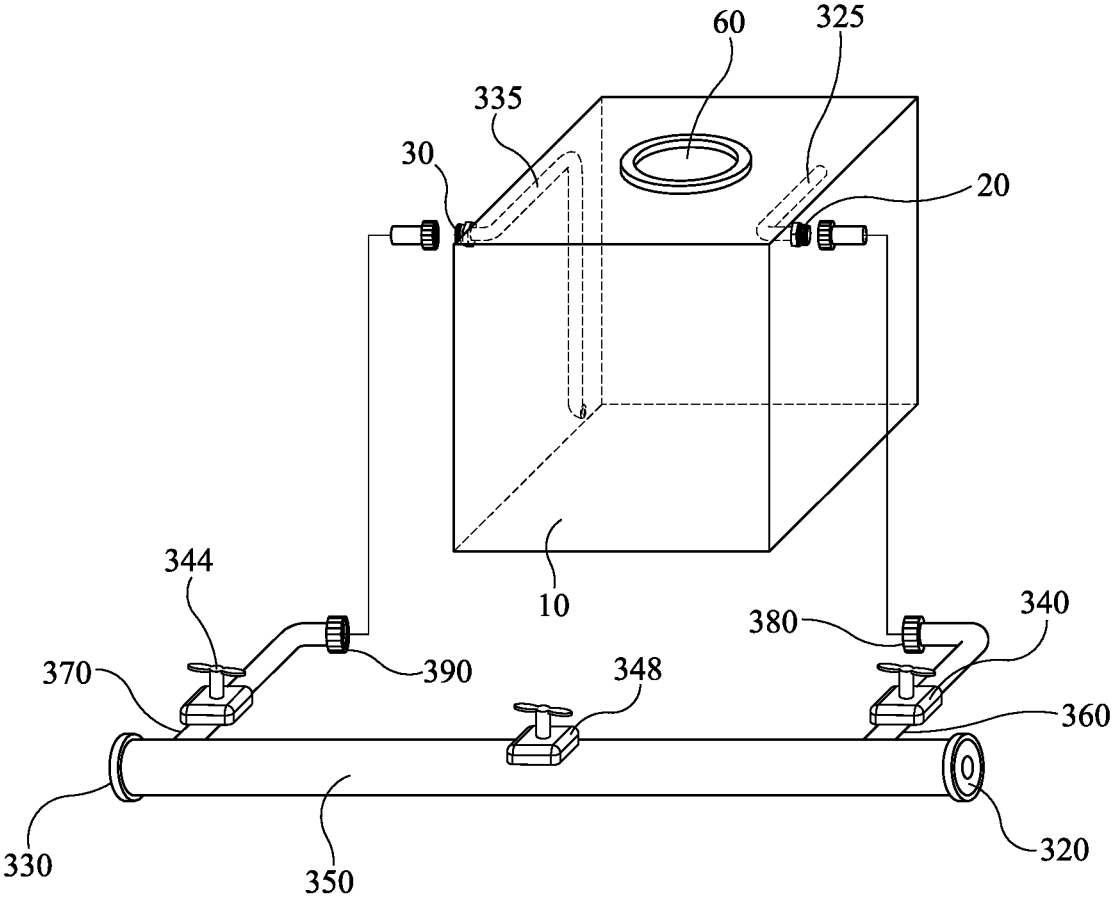
FIG. 5 depicts a front and side view of an example embodiment of the present invention incorporating an external manifold.

External manifold conduit (350), shown as a pipe or tube but also may be constructed as another fluid pathway, is disposed between external manifold cooling water inlet (320) and external manifold cooling water outlet (330) as depicted in FIG. 5. A first end of external manifold inlet conduit branch (360), proximate to and downstream from cooling water inlet (320), is attached to and in fluid communication with external manifold conduit (350). In addition, a second end of external manifold inlet conduit branch (380) is attached to and in fluid communication with the exterior side of cooling water inlet (20) of the precooler apparatus. Within the precooler apparatus, a first end of cooling water inlet extension (325) is attached to and in fluid communication with the interior side of cooling water inlet (20). A second end of cooling water inlet extension (325) remains unattached, but in fluid communication with interior chamber (10). Also, within the precooler apparatus, an unattached first end of cooling water outlet extension (335) is in fluid communication with interior chamber (10). A second end of cooling water outlet extension (335) is attached to and in fluid communication with the interior side of cooling water outlet (30). A first end of external manifold outlet conduit branch (390) is attached to and in fluid communication with the exterior side of cooling water outlet (30) of the precooler apparatus. Furthermore, a second end of external manifold outlet conduit branch (370), proximate to and upstream from external manifold cooling water outlet (330), is attached to and in fluid communication with external manifold conduit (350).

External manifold inlet conduit branch (360) maintains external manifold inlet valve (340) proximate to external manifold conduit (350). External manifold inlet valve (340) may be positioned in a manner that, when open, allows the inlet cooling water stream to be directed from external manifold conduit (350) through external manifold inlet conduit branch (360), through second end of external manifold inlet conduit branch (380), through cooling water inlet (20), through cooling water inlet extension (325) into interior chamber (10) of the precooler apparatus, or, when fully closed, directs the inlet cooling water stream through external manifold conduit (350) on a path to external manifold cooling water outlet (330) bypassing interior chamber (10). External manifold outlet conduit branch (370) maintains external manifold outlet valve (344) proximate to external manifold conduit (350). External manifold outlet valve (344) is positioned in a manner that, when open, allows the cooling water stream to be directed from interior chamber (10), through cooling water outlet extension (335), through cooling water outlet (30), through first end of external manifold outlet conduit branch (390), through external manifold outlet branch (370) into external manifold conduit (350) on a path to external manifold cooling water outlet (330) or, when fully closed, prevents the cooling water stream from exiting interior chamber (10) of the precooler apparatus. In addition, external manifold conduit (350) maintains external manifold conduit bypass valve (348), positioned between external manifold inlet conduit branch (360) and external manifold outlet conduit branch (370). External manifold conduit bypass valve (348), when open, allows the cooling water stream to flow through external manifold conduit (350) from external manifold cooling water inlet (320) to external manifold cooling water outlet (330) or, when fully closed, prevents the cooling water stream from flowing from external manifold cooling water inlet (320) through external manifold conduit (350) to external manifold cooling water outlet (330).

A variation of this embodiment incorporates a similarly situated portable enclosed container with self-closing quick-disconnect valves at cooling water inlet (20), cooling water outlet (30), external manifold cooling water inlet (320), external manifold cooling water outlet (330), second end of external manifold inlet conduit branch (380), and first end of external manifold outlet conduit branch (390) of the precooler apparatus and external manifold shown in FIG. 5. In this variation both the household water supply hose that attaches to cooling water inlet (20) and the heat exchange equipment hose that attaches to cooling water outlet (30) terminate with self-closing quick-disconnect valves that are compatible with connecting to each other and the other self-closing quick-disconnect valves disclosed with the precooler apparatus and external manifold.

Use of the precooler apparatus and external manifold incorporating self-closing quick-disconnect valves remains the same as previously disclosed in this scenario except that the connections and disconnections can be made more quickly. In particular, the variable flow characteristics provided by external manifold inlet valve (340), external manifold outlet valve (344), and external manifold conduit bypass valve (348) remain as earlier described.

Furthermore, the precooler apparatus with self-closing quick-disconnect valves may be used in several configurations without incorporating the external manifold component. In the configuration with the household water supply hose attached to cooling water inlet (20) and the heat exchange equipment hose attached to cooling water outlet (30), the entirety of the cooling water stream passes through the precooler apparatus for full cooling effect. In the configurations where either the household water supply hose or the heat exchange equipment hose or both are not attached, the flow of the cooling water stream is suspended. In the configuration with the household water supply hose attached directly to the heat exchange equipment hose, the flow of the cooling water stream effectively bypasses any cooling provided by the precooler apparatus.

The presence of self-closing quick-disconnect valves in these configurations allows the homebrewer to quickly change between full-cooling, bypass, and no flow configurations with little interruption to the cooling process.

Finally, coupling the precooler apparatus with an optional external manifold allows it to be integrated into an "all-in-one" brew system with the necessary manual or electronic flow controls externally located. In such an arrangement, a similar number of external valves and connections may be incorporated to: 1) start and stop the cooling water stream, 2) control the total flow of the cooling water stream, 3) direct the cooling water stream around or bypass interior chamber (10), 4) direct flow through interior chamber (10), 5) control the relative flow of the cooling water stream through and around interior chamber (10), or 6) drain water from the cooling system.

As disclosed in this scenario, an external manifold component may be integrated with the components disclosed in scenario 2 and scenario 3.

SCENARIO 5—Fixed Temperature Precooler Apparatus with a manifold and no valves:

In another embodiment, the precooler apparatus incorporates a similarly situated portable enclosed container with an integrated manifold consisting of conduit (50) disposed between cooling water inlet (20) and cooling water outlet (30), a similarly situated inlet conduit branch (210), and a similarly situated outlet conduit branch (220). However, in this embodiment the integrated manifold is without valves. Therefore, the cooling water stream simultaneously passes through both the entirety of conduit (50) and media-filled interior chamber (10) in a fixed ratio based on the relative pressure drop associated with the fluid flow through each pathway. As a result, this fixed ratio fluid flow produces a constant and predictable cooling water stream outlet temperature. A homebrewer may select a precooler apparatus without valves that is specifically configured to produce a narrow range of cooling water stream outlet temperatures.

The operation of this embodiment is similar to the first embodiment except that the only controlled variable is the total flow rate through the apparatus. A homebrewer accomplishes this flow rate control by adjusting a conventional hose valve, sink faucet, or other flow control valve at the source of the household cooling water. Since the cooling water stream passing through conduit (50) is approximately at a household temperature of 70° F. and the cooling water stream passing through interior chamber (10) is approximately 32° F., when ice-filled, the final temperature, after mixing these two portions of the cooling water stream, is between these two temperature values and determined by the relative flow rate of each portion of the stream. The result is that this embodiment provides a specific cooling water stream temperature at any value between and including a nominal household temperature of 70° F. and an ice-chilled 32° F.

In the various arrangements of this embodiment, the relative pressure drop is determined consistent with the principles of fluid dynamics. In an arrangement having a specific type of construction material and a particular total flow rate, the relative pressure drop is determined by: 1) the cross-sectional area for fluid flow in each pathway, 2) the total length of each pathway, and 3) the number and type of interruptions to the flow momentum in each pathway (e.g., direction changes, diameter changes, and obstructions). Any of these parameters may be used to control the relative pressure drop and the resulting outlet cooling water temperature.

In several arrangements of the embodiment, the precooler apparatus maintains conduit (50), inlet conduit branch (210), and outlet conduit branch (220) similar to the configuration shown in FIG. 1. In addition, these arrangements disclose a precooler apparatus constructed of high-density polyethylene ("HDPE") and configured for three (3) gallon per minute (gpm) total flow rate. Furthermore, FIG. 7 shows certain parameters for determining the pressure drops in these arrangements of the embodiment. The figure illustrates: 1) a range of values for the ratio of the cross-sectional area for flow through the conduit pathway to the cross-sectional area for flow through the interior path of the precooler apparatus, and, 2) a number of values for momentum interruptions through the conduit pathway and through the interior pathway of the precooler apparatus. These two parameters primarily control the corresponding pressure drops and resulting cooling water stream outlet temperatures. In these arrangements of the embodiment, the relative lengths of the pathways do not significantly alter the pressure drops. Therefore, FIG. 7 shows that they remain constant.

In other arrangements of this embodiment the precooler apparatus may be constructed of high-density polyethylene ("HDPE"), stainless steel, or any other suitable material. Also, the precooler apparatus may be configured for any range of total flow rates suitable from a household source. However, in these arrangements, all of the fluid flow is directed through the interior pathway. As a result, there is no ratio of flow rates nor any momentum interruptions that affect the cooling water stream outlet temperature. Since all of the fluid flow is through ice-filled interior chamber (10), this arrangement produces the lowest possible cooling water stream outlet temperature of 32° F., which is the nominal freezing point of water.

These arrangements of this embodiment, together with the variety of arrangements of this embodiment depicted in FIG. 7, disclose several of a wide selection of precooler apparatus designs that can achieve a specific cooling water outlet temperature anywhere between the nominal household water temperature of 70° F. and the nominal freezing point of water of 32° F.

Consistent with the prior embodiments and their related arrangements, a precooler apparatus of any embodiment may be connected to another precooler apparatus of any embodiment in a series of more than two precooler apparatuses. In such a series, the cooling water stream exiting the outlet of one precooler apparatus serves as the cooling water stream entering the inlet to the next precooler apparatus in the series.

There are several reasons a homebrewer may desire to connect two or more precooler apparatuses together. First, if a homebrewer is making a large batch of beerwort, the additional cooling capacity of one or more additional precooler apparatuses may be necessary to reduce or eliminate reloading cooling media in a single precooler apparatus during beerwort cooling. Second, if a homebrewer connects two or more precooler apparatuses in series as shown, for example, in FIG. 3, one precooler apparatus may be reloaded with cooling media while any precooler apparatuses remaining connected in series may continue to cool the cooling water stream.

A subsequent embodiment of the precooler apparatus maintains two or more interior chambers and associated manifolds, valves and lids, within a single unit. This embodiment allows each interior chamber to be filled with cooling media and closed separately. The associated manifolds and valves allow the homebrewer to control the flow of the cooling water stream through or around each of the interior chambers individually. With this embodiment, the homebrewer can cause the cooling water stream to bypass or flow partially or completely through each individual interior chamber. Furthermore, the individual control of the cooling water stream through each interior chamber allows the use of one interior chamber while the other interior chambers are being emptied and refilled with additional cooling media. Despite being a single unit, this embodiment operates in a manner equivalent to two or more precooler apparatuses connected in series.

Additionally, the embodiments of the present invention may incorporate temperature and flow rate sensors together with corresponding local or remote displays. In an example embodiment, a temperature sensor and corresponding display measures and displays the temperature at cooling water outlet (30) to assist a homebrewer identify a desired outlet cooling water stream temperature or determine if the cooling media has been depleted. In other embodiments, both temperature and flow rate sensors together with corresponding local or remote displays are located at cooling water inlet (20), cooling water outlet (30), and interior chamber (10) to provide additional information to the homebrewer about precooler apparatus performance. Other embodiments of the present invention may employ a colorimetric device, including all or a portion of the portable enclosed container of the precooler apparatus. In such embodiments, the colorimetric device exhibits one color at room temperature and a different color when colder than room temperature. Such color indications allow a homebrewer to determine if the cooling media has been depleted.

Furthermore, the prior embodiments and their related arrangements may be preferably equipped with at least one transparent pane or panel to facilitate viewing inside interior chamber (10). This enables the homebrewer to quickly and easily determine if more cooling media is required. In some embodiments, threaded female lid (140) is transparent. In other embodiments, the entire apparatus is transparent.

Finally, the prior embodiments and their related arrangements may employ self-closing quick disconnect valves for the exterior connections to cooling water inlet (20) and cooling water outlet (30). Such connection methods prevent spilling when hoses or lines are connected to or disconnected from cooling water inlet (20) and cooling water outlet (30). As a result, there is no requirement for positioning cooling water inlet (20) and cooling water outlet (30) near the top of the precooler apparatus to avoid spilling portions of the cooling water stream. In this embodiment, cooling water inlet (20) and cooling water outlet (30) may be positioned in any necessary and convenient location on the exterior of the precooler apparatus.

Figure 6A:
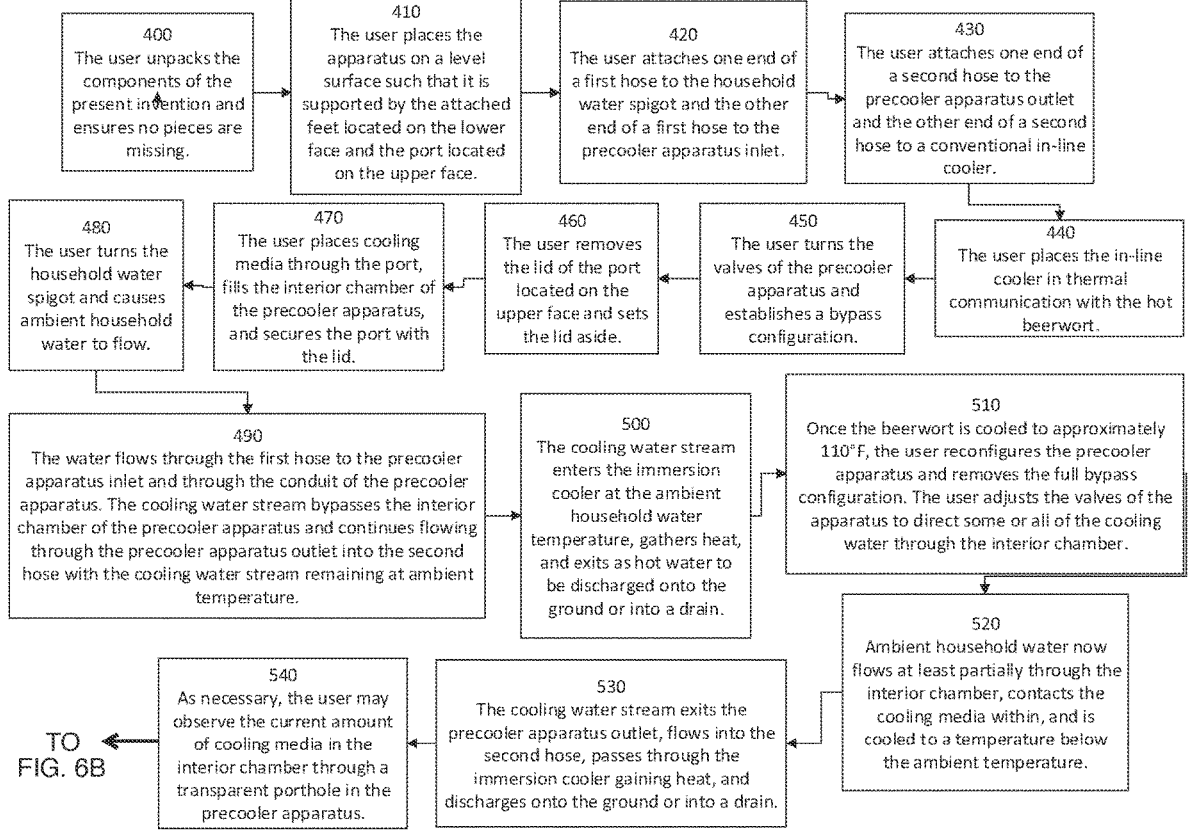
FIG. 6A depicts a flow chart detailing the preferable process of assembly and use for the present invention.

The preferable process of assembly and use of the precooler apparatus with any conventional in-line coolers, including, but not limited to, an immersion cooler, as similarly shown in FIG. 6A and FIG. 6B, is as follows:

1. The user unpacks the components of the present invention and ensures no pieces are missing. (400)
2. The user places the apparatus on a level surface such that it is supported by the attached feet located on the lower face and the port located on the upper face. (410)
3. The user attaches one end of a first hose to the household water spigot and the other end of a first hose to the precooler apparatus inlet. (420)
4. The user attaches one end of a second hose to the precooler apparatus outlet and the other end of a second hose to a conventional in-line cooler. (430)
5. The user places the in-line cooler in thermal communication with the hot beerwort. (440)

6. The user turns the valves of the precooler apparatus and establishes a bypass configuration. (450)
7. The user removes the lid of the port located on the upper face and sets the lid aside. (460)
8. The user places cooling media through the port, fills the interior chamber of the precooler apparatus, and secures the port with the lid. (470)
9. The user turns the household water spigot and causes ambient household water to flow. (480)
10. The water flows through the first hose to the precooler apparatus inlet and through the conduit of the precooler apparatus. The cooling water stream bypasses the interior chamber of the precooler apparatus and continues flowing through the precooler apparatus outlet into the second hose with the cooling water stream remaining at ambient temperature. (490)
11. The cooling water stream enters the immersion cooler at the ambient household water temperature, gathers heat, and exits as hot water to be discharged onto the ground or into a drain. (500)
12. Once the beerwort is cooled to approximately 110° F., the user reconfigures the precooler apparatus and removes the full bypass configuration. The user adjusts the valves of the apparatus to direct some or all of the cooling water through the interior chamber. (510)
13. Ambient household water now flows at least partially through the interior chamber, contacts the cooling media within, and is cooled to a temperature below the ambient temperature. (520)
14. The cooling water stream exits the precooler apparatus outlet, flows into the second hose, passes through the immersion cooler gaining heat, and discharges onto the ground or into a drain. (530)
15. As necessary, the user may observe the current amount of cooling media in the interior chamber through a transparent porthole in the precooler apparatus. (540)
16. Once the cooling power of the cooling media is consumed within the interior chamber, the user reconfigures the precooler apparatus to the bypass configuration. Once again, the cooling water stream bypasses the interior chamber of the precooler apparatus, remains at ambient temperature, and continues flowing through the precooler apparatus outlet into the second hose. (550)
17. If necessary, the user may open one or more drain valves to drain water from the interior chamber, which may provide space for additional cooling media to be added to the interior chamber through the port. (560)
18. The user accesses the interior chamber of the precooler apparatus and again fills it with cooling media in accordance with steps 6 through 8. (570)
19. The user positions the valves in accordance with step 12 to resume partial or total flow of the cooling water stream through the interior chamber. (580)
20. The user repeats steps 15 through 19 until the beerwort has cooled to the desired temperature. (590)

Figure 3:
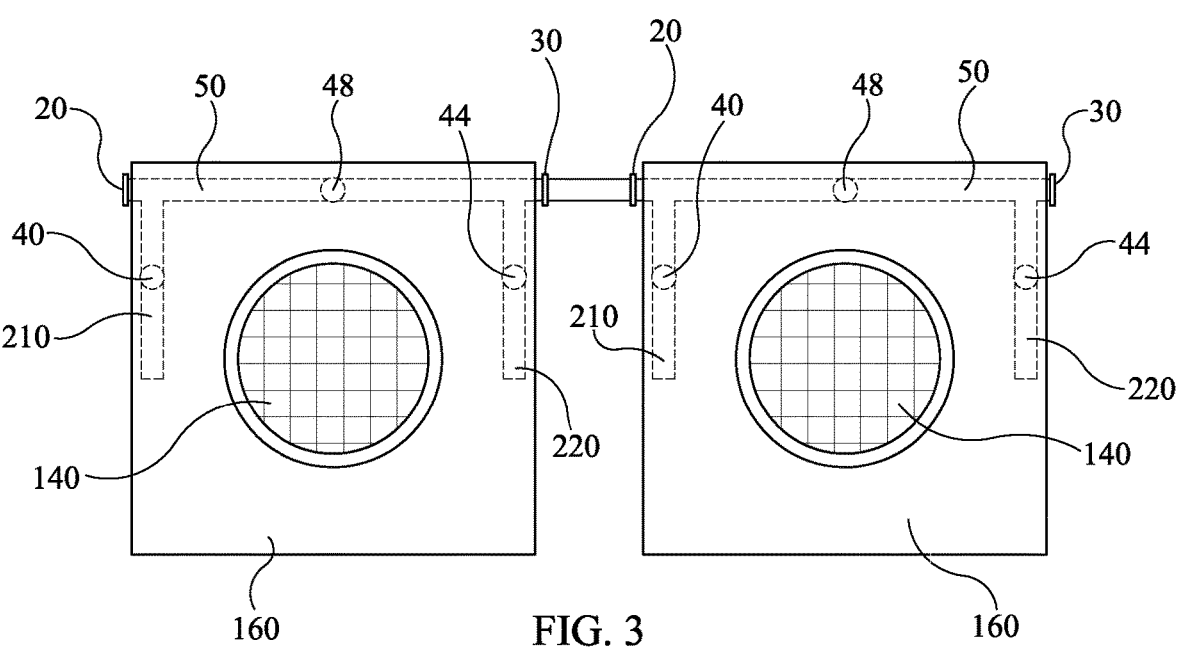
FIG. 3 depicts a top view of two units of the present invention connected in series.

The in-series connection is shown in FIG. 3 as one way to connect two or more units together. Other similar connection methods could be used to connect multiple iterations of the apparatus of the present invention together in series or parallel, which could also include building a unit that has two or more chambers.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A precooler apparatus comprising:
a body, said body equipped with an interior chamber disposed inside said body;
a port on said body, said port configured to allow adding cooling media into said interior chamber;
a lid, said lid configured to maintain the pressure of the water source within the interior chamber when sealed with said port;
an inlet, said inlet equipped with an inlet connector;
an inlet extension having a first end and a second end, said first end of said inlet extension in communication with said inlet, said second end of inlet extension in communication with said interior chamber;
an outlet, said outlet equipped with an outlet connector;
an outlet extension having a first end and a second end, said first end of outlet extension in communication with said interior chamber, said second end of outlet extension in communication with said outlet;
a manifold, said manifold comprising:
a primary conduit, said primary conduit having a primary conduit inlet side and a primary conduit outlet side, said primary conduit having a primary conduit inlet disposed on the exterior of said primary conduit inlet side, said primary conduit having a primary conduit outlet disposed on the exterior of said primary conduit outlet side;
a primary conduit inlet connector, said primary conduit inlet connector in communication with said primary conduit inlet;
a primary conduit outlet connector, said primary conduit outlet connector in communication with said primary conduit outlet;
a first conduit branch having a first end and a second end, said first end of first conduit branch in communication with said primary conduit inlet side, said second end of first conduit branch in communication with said inlet connector of said inlet;
a second conduit branch having a first end and a second end, said first end of second conduit branch in communication with said outlet connector of said outlet, said second end of second conduit branch in communication with said primary conduit outlet side;
an inlet valve, said inlet valve disposed within said first conduit branch;
an outlet valve, said outlet valve disposed within said second conduit branch; and
a bypass valve, said bypass valve disposed within said primary conduit, wherein said bypass valve is downstream of said first end of said first conduit branch and said bypass valve is upstream of said second end of said second conduit branch.

2. A precooler apparatus comprising:
a body, said body equipped with an interior chamber disposed inside said body;
a port on said body, said port configured to allow adding cooling media into said interior chamber;
a lid, said lid configured to maintain the pressure of the water source within the interior chamber when sealed with said port;
an inlet, said inlet equipped with an inlet connector;
an inlet extension having a first end and a second end, said first end of said inlet extension in communication with said inlet, said second end of inlet extension in communication with said interior chamber;
an outlet, said outlet equipped with an outlet connector;
an outlet extension having a first end and a second end, said first end of outlet extension in communication with said interior chamber, said second end of outlet extension in communication with said outlet;
a manifold, said manifold comprising:
a primary conduit, said primary conduit having a primary conduit inlet side and a primary conduit outlet side, said primary conduit having a primary conduit inlet disposed on the exterior of said primary conduit inlet side, said primary conduit having a primary conduit outlet disposed on the exterior of said primary conduit outlet side;
a primary conduit inlet connector, said primary conduit inlet connector in communication with said primary conduit inlet;
a primary conduit outlet connector, said primary conduit outlet connector in communication with said primary conduit outlet;
a first conduit branch having a first end and a second end, said first end of first conduit branch in communication with said primary conduit inlet side, said second end of first conduit branch in communication with said inlet connector of said inlet;
a second conduit branch having a first end and a second end, said first end of second conduit branch in communication with said outlet connector of said outlet, said second end of second conduit branch in communication with said primary conduit outlet side;
an inlet valve, said inlet valve disposed in communication with said primary conduit and said first conduit branch, wherein said inlet valve is a three-way valve configured to moderate the flow of water through both said primary conduit to said primary conduit outlet and said first conduit branch to said interior chamber; and
an outlet valve, said outlet valve disposed within said second conduit branch.

3. A precooler apparatus comprising:
a body, said body equipped with an interior chamber disposed inside said body:
a port on said body, said port configured to allow adding cooling media into said interior chamber;
a lid, said lid configured to maintain the pressure of the water source within the interior chamber when sealed with said port;
an inlet, said inlet equipped with an inlet connector;
an inlet extension having a first end and a second end, said first end of said inlet extension in communication with said inlet, said second end of inlet extension in communication with said interior chamber;
an outlet, said outlet equipped with an outlet connector;
an outlet extension having a first end and a second end, said first end of outlet extension in communication with said interior chamber, said second end of outlet extension in communication with said outlet;

wherein said inlet connector is an inlet quick-disconnect valve and said outlet connector is an outlet quick-disconnect valve, further comprising:

an outer inlet quick-disconnect valve having a first side and a second side; wherein said outer inlet quick-disconnect valve first side is a hose connector; wherein said outer inlet quick-disconnect valve second side is in releasable communication with said inlet quick-disconnect valve;

an outer outlet quick-disconnect valve having a first side and a second side; wherein said outer outlet quick-disconnect valve first side is in releasable communication with said outlet quick-disconnect valve;

wherein said outer outlet quick-disconnect valve second side is a hose connector; and wherein said outer inlet quick-disconnect valve second side may be released from said quick-disconnect valve and said outer outlet quick-disconnect valve first side may be released from said outlet quick-disconnect valve and said outer inlet quick-disconnect valve second side may be subsequently connected to said outer outlet quick-disconnect valve first side thereby bypassing said body.

\* \* \* \* \*